United States Patent Office 2,717,260
Patented Sept. 6, 1955

2,717,260
HYDROCARBON SYNTHESIS

Hubert G. Davis and Thomas P. Wilson, Charleston, and Abraham N. Kurtz, St. Albans, W. Va., assignors to Union Carbide and Carbon Corporation, a corporation of New York No Drawing. Application January 17, 1952,
Serial No. 266,991

4 Claims. (Cl. 260—449.6)

This invention relates to an improvement in the synthesis of hydrocarbons from carbon monoxide and hydrogen whereby an increased yield of gaseous olefins is obtained.

In a co-pending application, Serial No. 136,813, filed January 4, 1950 by H. G. Davis and T. P. Wilson a process is described in which certain halogens or halogen compounds are added as inhibitors to an iron-base synthesis catalyst and redistributed synthesis products obtained which contain relatively increased amounts of gaseous $C_2$–$C_4$ olefins. It has now been found that a further increase in the yield of these $C_2$–$C_4$ olefins is obtained when iron-base synthesis catalysts are subjected to a combined treatment with sulfur or sulfur compounds and the previously mentioned halogens or halogen compounds.

While sulfur alone has heretofore been used in the treatment of hydrogen synthesis catalysts, its effects have varied with the specific catalyst and method of treatment. Working with iron-base catalysts, we have determined that treatment of the catalysts with sulfur alone promotes the formation of saturated hydrocarbons of low molecular weight, in particular methane, ethane and propane. However, saturated hydrocarbons of this character are readily available in natural gas, and thus a synthetic source of the gaseous paraffins is not economically desirable at the present time. Furthermore, natural gas is, at present, one of the more available raw materials for the manufacture of synthesis gas, so that a hydrocarbon synthesis process which produced the same constituents as natural gas, would be of little economic value at present, even though the synthetic gas was richer in the higher paraffins.

On the other hand, when sulfur is used to treat iron-base synthesis catalysts in combination with the halogens, chlorine, bromine, or iodine, or compounds of these halogens, an effect is obtained which is entirely different from that obtained when sulfur alone is used. The products formed in the presence of iron catalysts which have received this combined treatment contain a larger fraction of $C_2$–$C_4$ olefins than do the products produced by catalysts which have received only the halogen treatment. Also, the hydrocarbons formed from catalysts which have received the combined treatment contain only small amounts of $C_2$–$C_4$ paraffins, and the amount of methane produced is generally less than when sulfur alone is used to treat the catalyst.

Treatment of the catalyst with the halogens is carried out as described in the co-pending application Serial No. 136,813 of H. G. Davis and T. P. Wilson, and treatment of the catalyst with sulfur may precede, accompany or follow the treatment with halogens. As pointed out in that application, the treatment with halogens is not permanent and halogen is lost from the halided catalyst during the course of synthesis because of equilibrium considerations which necessitates periodic or continuous replacement of the depleted halogen. On the other hand, the effect of adding sulfur to a halide-inhibited catalyst is much more permanent and the effects of a single treatment persist over runs of considerable duration. However, in commercial practice, some replenishment of the sulfur content during the life of a commercial catalyst will undoubtedly be required. Because of the relatively permanent nature of the sulfur treatment, the sulfur may be added to the catalyst during preparation, in the form of an inorganic sulfate, for example, such as ferric or ferrous sulfate, but better control of the amounts to be added can be obtained by treating the catalyst in situ with synthesis gas containing a volatile compound of sulfur, such as diethyl sulfate, hydrogen sulfide, butyl or ethyl sulfide, ethyl or butyl mercaptan, carbon oxysulfide or carbon bisulfide.

The amount of sulfur to be added to the catalyst is quite important, as excessive additions of sulfur will destroy the catalyst activity. A noticeable increase in the $C_2$–$C_4$ olefins formed is obtained when only 0.02% by weight of sulfur is added, calculated as elemental sulfur on the catalyst weight, and the amounts of these olefins formed increase up to their maximum values as the sulfur content of the catalyst is increased up to 0.10% by weight. Accompanying this increase in olefin content with increasing concentration of sulfur on the catalyst is a decline in the catalyst activity, necessitating an increase in the catalyst temperature to maintain a constant conversion of synthesis gas to total hydrocarbons. As a rough approximation, the reaction temperature should be raised 5° to 10° C. to maintain constant conversion for each part of sulfur added per 10,000 parts of catalyst, starting with unpromoted catalysts and an initial reaction temperature of 250 to 290° C. However, the conversion can be permitted to decline, and the reaction temperature raised less than this amount. Based on these considerations, the optimum sulfur content of the unpromoted catalysts is 0.4 to 0.1% by weight of the catalyst. Amounts of sulfur as high as 0.5% are the maximum amounts permissible with unpromoted iron catalysts. By the addition of alkali promoters, however, the tolerance of the catalyst for sulfur can be increased.

Since both sulfur and halogens are added as inhibitors to the catalysts, the effetcs of sulfur must be considered in relation to the effects of halogen on the catalyst. As inhibition with halides also tends to decrease the activity of the catalyst, careful correlation of the combined inhibition is necessary for the best results. Therefore, it is desirable to initiate the synthesis reaction with a reduced and well-activated catalyst and then bring the catalyst into a state of controlled and steady-state inhibition by treatment with sulfur and halogen inhibitors. It is preferable to add each type of inhibitor separately, although the order of addition of the inhibitors may be altered. Thus, after an initial treatment with halogen inhibitor, and when the halogen treatment has become stabilized and the characteristic effects of halogen inhibition obtained, which are an increase in the $C_2$–$C_4$ olefin fraction and a sharp increase in the ratio of water to carbon dioxide formed in the synthesis, then the treatment of the catalyst with sulfur may be commenced. By introducing the sulfur as a volatile compound with the synthesis gas, the amount of sulfur added to the catalyst can be carefully controlled and correlated with changes in the products of the reaction so that the optimum amount of sulfur will be added.

In order to demonstrate the difference in results obtained with the addition of halogen alone as an inhibitor and both halogen and sulfur as inhibitors, comparative runs were carried out. In each case, the catalyst was prepared from a taconite ore concentrate ($Fe_3O_4$) which had been roasted and ground to a size range of about 20 microns to 120 microns. Its particle size distribution was such that it was suitable as a fluid bed catalyst. The fluidized catalyst was reduced with hydrogen for 24 hours at 480° C. and atmospheric pressure with a flow rate of 250 to 400 cubic feet per hour per cubic foot of catalyst. The catalyst was then treated with synthesis gas (2.2 $H_2$:1CO) at 230–280° C. for four to six hours, the other conditions being the same as during the reducing period. Synthesis was then started at 60 p. s. i. g. using synthesis gas of the above composition and at the same linear velocity used in the forming process.

In both runs, halogen inhibition was instituted by feeding beta,beta'-dichlorethyl ether with the synthesis gas at equilibrium conditions. An equilibrium concentration of inhibitor is that concentration at which the calculated pressure of HCl resulting from complete decomposition of the chlorinated ether equals the equilibrium pressure of HCl for the Fe—$FeO_2$—$H_2$—HCl system under the conditions existing at the outlet end of the catalyst bed. This equilibrium concentration is further described in the above-mentioned application, Serial No. 136,813. In one of these runs, ethyl sulfate corresponding to 0.05% sulfur by weight of the catalyst was then added over a period of one hour by saturating the entering synthesis gas with the volatile sulfate. Inhibition of the catalyst with dichlorethyl ether was continued during and after the inhibition with sulfur.

The results of the runs are given in the table below:

TABLE I

*Effects of sulfur and halide inhibition*

| Run No. | 1 | 2 |
|---|---|---|
| Inhibitor | Chloride alone | Sulfur plus chloride |
| Temp., °C | 328 | 372 |
| Pressure, p. s. i. g | 60 | 60 |
| Inlet space velocity, C. F. H. gas/ C. F. Cat. | 1,600 | 1,600 |
| Conversion, Percent | 39 | 36 |
| Age of catalyst, Hrs | 180 | 330 |
| Sulfur added, percent by weight of catalyst | None | 0.05 |
| Products, percent of total hydrocarbons, carbon atom basis: | | |
| $CH_4$ | 9 | 23 |
| $C_2H_6$ | 1.6 | 3.1 |
| $C_3H_8$ | 0.8 | 0.7 |
| $C_4H_{10}$ | 0.5 | 0.4 |
| $C_2$–$C_4$ paraffins | 3 | 4 |
| $C_2H_4$ | 9.3 | 21.5 |
| $C_3H_6$ | 16.6 | 22.2 |
| $C_4H_8$ | 10.2 | 10.8 |
| $C_2$–$C_4$ olefins | 36 | 55 |
| $C_5+$ (Estimated) | 48 | 15 |
| Undetermined | 4 | 3 |
| Total | 100 | 100 |
| $CO_2/(CO_2+H_2O)$, Percent | 3 | 6 |

From these results it is seen that treatment of the catalyst with halogen alone promotes the formation of $C_2$–$C_4$ olefins, but considerable amounts of heavier fractions are also obtained. The combined inhibition with sulfur and chloride has a very specific effect giving a high yield of the desired $C_2$–$C_4$ olefins. Most significantly, there is practically no increase in the $C_2$–$C_4$ paraffins resulting from the combined treatment of the catalyst with sulfur and chlorine, but there is a very appreciable increase in the amount of $C_2$–$C_4$ olefins formed. Also, the combined treatment with sulfur and chlorine causes a redistribution of the olefins in the $C_2$–$C_4$ fraction, over that resulting from chlorine inhibition alone, in particular the yield of ethylene being more than doubled.

With respect to the effect of the combined inhibition on the other reaction conditions, it is seen that the reaction temperature has been increased in order to maintain the conversion of synthesis gas to total hydrocarbons. Also, it is noted that water is the principal co-product of the synthesis when halogen is used alone or in combination with sulfur. The formation of water as the co-product of the synthesis is advantageous as it is easier to remove from the other gases.

In so far as the other conditions of the reaction are concerned, they do not differ radically from that described in the co-pending application, Serial No. 136,813. Thus, the temperature of the reaction may be in the range of 250° to 420° C., and preferably in the range of 300° to 380° C. The reaction pressure may vary from 25 to 500 p. s. i. absolute, but is preferably within the range of 60 to 300 p. s. i. absolute. Also, the synthesis gas ratio, $H_2$:CO, may vary from 1:2 to 5:1. The inhibition with halides is also carried out as described in the above application, and consists in subjecting the catalyst during synthesis to intimate contact with regulated amounts of members of the groups consisting of (1) chlorine, bromine and iodine, (2) hydrogen chloride, hydrogen bromide and hydrogen iodide, and (3) halide-containing compounds capable of releasing the aforesaid halogens or halogen halides in contact with the catalyst.

What is claimed is:

1. In the process for making hydrocarbons containing a substantial amount of olefins having from two to four carbon atoms by the reaction of carbon monoxide and hydrogen in the presence of an iron-base catalyst, the improvements which comprise incorporating an amount of sulfur in the catalyst equal to from 0.02% to 0.5% by weight of the catalyst and subjecting the catalyst during the reaction to intimate contact with regulated amounts of members of the group consisting of (1) chlorine, bromine and iodine, (2) hydrogen chloride, hydrogen bromide and hydrogen iodide and (3) halide-containing compounds capable of releasing the aforesaid halogens or halogen halides in contact with the catalyst.

2. Process as claimed in claim 1 in which the amount of sulfur is from 0.04 to 0.1% by weight of the catalyst.

3. Process of making hydrocarbons containing a substantial amount of olefins having from two to four carbon atoms which comprises passing a mixture containing carbon monoxide and hydrogen under superatmospheric pressure over an iron-base catalyst containing a small amount of sulfur at a temperature of 250° to 420° C., said amount of sulfur being from 0.02% to 0.5% by weight of the catalyst, and subjecting the catalyst during the reaction to intimate contact with regulated amounts of members of the group consisting of (1) chlorine, bromine and iodine, (2) hydrogen chloride, hydrogen bromide and hydrogen iodide and (3) halide-containing compounds capable of releasing the aforesaid halogens or halogen halides in contact with the catalyst.

4. Process of making hydrocarbons containing a substantial amount of olefins having from two to four carbon atoms which comprises passing a mixture containing carbon monoxide and hydrogen under superatmospheric pressure over an iron-base catalyst at a temperature of 250° to 420° C., and subjecting the catalyst during the reaction to intimate contact with controlled amounts of a volatile sulfur compound and with regulated amounts of members of the group consisting of (1) chlorine, bromine and iodine, (2) hydrogen chloride, hydrogen bromide and hydrogen iodide and (3) halide-containing compounds capable of releasing the aforesaid halogens or halogen halides in contact with the catalyst, the amount of sulfur so introduced to the catalyst being from 0.02% to 0.5% by weight of the catalyst.

References Cited in the file of this patent

UNITED STATES PATENTS

| | | |
|---|---|---|
| 2,039,459 | Seguy | May 5, 1936 |
| 2,245,157 | Pier et al. | June 10, 1941 |
| 2,446,426 | Layng | Aug. 3, 1948 |
| 2,526,651 | Garbo | Oct. 24, 1950 |

FOREIGN PATENTS

| | | |
|---|---|---|
| 322,284 | Great Britain | Dec. 5, 1929 |
| 509,325 | Great Britain | July 14, 1939 |

OTHER REFERENCES

Storch et al., The Fischer-Tropsch and Related Processes, John Wiley and Sons, Inc., New York, 1951, pages 312 to 315.